(12) United States Patent
Post et al.

(10) Patent No.: US 9,530,032 B2
(45) Date of Patent: Dec. 27, 2016

(54) CARD READER COMMUNICATION METHOD

(71) Applicant: Square, Inc., San Francisco, CA (US)

(72) Inventors: Daniel Jeffrey Post, San Mateo, CA (US); Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/966,985

(22) Filed: Dec. 11, 2015

(65) Prior Publication Data

US 2016/0098583 A1 Apr. 7, 2016

Related U.S. Application Data

(63) Continuation of application No. 13/841,689, filed on Mar. 15, 2013, now Pat. No. 9,286,500.

(51) Int. Cl.
| | |
|---|---|
| *G06K 7/14* | (2006.01) |
| *G06K 19/077* | (2006.01) |
| *G06K 7/01* | (2006.01) |
| *G06K 7/10* | (2006.01) |
| *G06K 7/08* | (2006.01) |

(52) U.S. Cl.
CPC ............ *G06K 7/10148* (2013.01); *G06K 7/01* (2013.01); *G06K 7/084* (2013.01); *G06K 7/10366* (2013.01); *G06K 7/14* (2013.01); *G06K 19/077* (2013.01)

(58) Field of Classification Search
USPC .................................................. 235/449, 492
See application file for complete search history.

(56) References Cited

U.S. PATENT DOCUMENTS

| | | | | |
|---|---|---|---|---|
| 5,241,161 | A | * | 8/1993 | Zuta ....................... G04G 21/00 235/382 |
| 5,789,733 | A | * | 8/1998 | Jachimowicz ....... G06K 7/1097 235/380 |
| 7,040,534 | B2 | | 5/2006 | Turocy et al. |
| 7,810,729 | B2 | | 10/2010 | Morley, Jr. |

(Continued)

OTHER PUBLICATIONS

Tobias Hesselmann,FlashLight: Optical Communication between Mobile Phones and Interactive Tabletops,Nov. 7-10, 2010, Saarbrucken, Germany,ITS 2010: Interactions, pp. 135-138 or pp. 1-4 ( PDF page=).*

(Continued)

*Primary Examiner* — David Payne
*Assistant Examiner* — Omar S Ismail
(74) *Attorney, Agent, or Firm* — Polsinelli PC

(57) ABSTRACT

A card reader includes a body, the body being configured for coupling with a device, the device including a device light sensor and a device light source; a reader light sensor that is configured to capture light being emitted from the device light source, wherein, when the body is coupled to the user device, the reader light sensor is positioned adjacent to the device light source; a reader light source that is configured to emit light to the device light sensor, wherein, when the body is coupled to the user device, the reader light source is positioned adjacent to the device light sensor; a reader interface positioned in the body and configured to read the card; and circuitry configured to communicate data between the card reader and the user device using the reader light sensor and the reader light source.

20 Claims, 3 Drawing Sheets

(56) References Cited

U.S. PATENT DOCUMENTS

| | | | |
|---|---|---|---|
| 8,128,002 B2 | 3/2012 | McCallum et al. | |
| 9,286,500 B1 | 3/2016 | Post et al. | |
| 2001/0015377 A1* | 8/2001 | Vassura | G06K 7/10881 235/454 |
| 2004/0099746 A1 | 5/2004 | Norton | |
| 2005/0247787 A1* | 11/2005 | Von Mueller | G06K 7/084 235/449 |
| 2010/0108762 A1* | 5/2010 | Morley, Jr. | G06K 7/083 235/449 |
| 2014/0016945 A1 | 1/2014 | Pan | |

OTHER PUBLICATIONS

Notice of Allowance mailed Feb. 12, 2016, in U.S. Appl. No. 13/841,689, of Post, D. J., et al., filed Mar. 15, 2013.
Tobias H. "Flashlight: Optical Communication between Mobile Phones and Interactive Tabletops," Saarbrucken, Germany,ITS 2010: Interactions, Nov. 7-10, 2010, pp. 135-138.
Non-Final Office Action mailed Oct. 2, 2014, in U.S. Appl. No. 13/841,689, of Post D.J., et al., filed Mar. 15, 2013.
Non-Final Office Action mailed Apr. 20, 2015, in U.S. Appl. No. 13/841,689, of Post D.J., et al., filed Mar. 15, 2013.
Final Office Action mailed Oct. 1, 2015, in U.S. Appl. No. 13/841,689, of Post D. J., et al., filed Mar. 15, 2013.
Notice of Allowance mailed Nov. 6, 2015, in U.S. Appl. No. 13/841,689, of Post, D. J., et al., filed Mar. 15, 2013.

* cited by examiner

CARD READER COMMUNICATION METHOD

CROSS-REFERENCE RELATED APPLICATIONS

This application is a continuation of U.S. patent application Ser. No. 13/841,689, entitled "CARD READER COMMUNICATION METHOD", filed on Mar. 15, 2013; which is hereby expressly incorporated herein by reference in its entirety.

TECHNICAL FIELD

This disclosure relates to a card reader.

BACKGROUND

Electronic devices, such as mobile phones, can include external connectors for interfacing with peripherals. One type of external connector is an audio jack, e.g., an audio socket. For example, the audio jack of a mobile device can be coupled with an audio plug of a credit card reader. Once coupled, the mobile device and the card reader can communicate data with one another by transmitting and receiving electrical signals through the audio plug. Other types of external connectors include USB ports and 30-pin connectors. Some electronic devices include wireless communication interfaces, e.g., wireless LAN and Bluetooth.

SUMMARY

In one aspect, a card reader includes a body, the body being configured for coupling with a device, the device including a device light sensor and a device light source; a reader light sensor that is configured to capture light being emitted from the device light source, wherein, when the body is coupled to the user device, the reader light sensor is positioned adjacent to the device light source; a reader light source that is configured to emit light to the device light sensor, wherein, when the body is coupled to the user device, the reader light source is positioned adjacent to the device light sensor; a reader interface positioned in the body and configured to read a magnetic stripe on the card as the card is swiped through the first slot along the first axis; and circuitry configured to communicate data between the card reader and the user device using the reader light sensor and the reader light source.

Implementations can include one or more of the following. The device light sensor is an ambient light sensor or a camera. The reader light sensor is an ambient light sensor or a camera. The reader light source is a light emitting diode or a flash. The body is coupled to the user device using a clip.

In one aspect, a method for transmitting data from a reader to a device includes generating, using the reader, an optical signal that describes data; transmitting, using a reader light source on the reader, the optical signal to a device light sensor on the device; receiving, using the device light sensor, the transmitted optical signal at the device; decoding, using the device, the optical signal into digital data; and processing a financial transaction using the digital data. Other implementations of this aspect include corresponding computer systems, apparatus, and computer programs recorded on one or more computer storage devices, each configured to perform the actions of the methods.

Implementations can include one or more of the following. The method further includes calibrating the reader with the device. The reader is a card reader and the data includes data obtained from reading a card using the card reader, and wherein the digital data describes the data obtained from the card.

In one aspect, a method for transmitting data from a device to a reader includes generating, using the device, an optical signal that describes data; transmitting, using a device light source on the device, the optical signal to a reader light sensor on the reader; receiving, using the reader light sensor, the transmitted optical signal at the reader; decoding, using the reader, the optical signal into digital data. Other implementations of this aspect include corresponding computer systems, apparatus, and computer programs recorded on one or more computer storage devices, each configured to perform the actions of the methods.

Implementations can include one or more of the following. The method further includes calibrating the reader with the device.

Advantages may include one or more of the following. Data can be transmitted from a card reader to a device using optical signals. Data can be transmitted from a card reader to a device without an audio jack. Data can be transmitted using optical signals and, as a result, may be subject to fewer filters than transmitting the data using an audio jack. Having fewer filters can allow encoding of the data using amplitude, which can increase system bandwidth.

BRIEF DESCRIPTION OF THE DRAWINGS

Like reference numbers and designations in the various drawings indicate like elements.

DETAILED DESCRIPTION

Figure 1B:
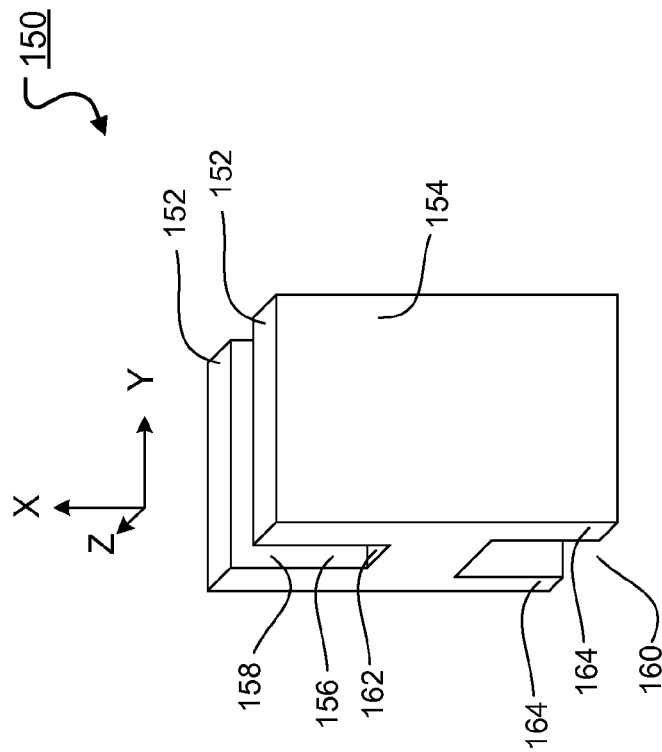
FIG. 1B is a schematic perspective view of an example card reader.
Figure 1A:
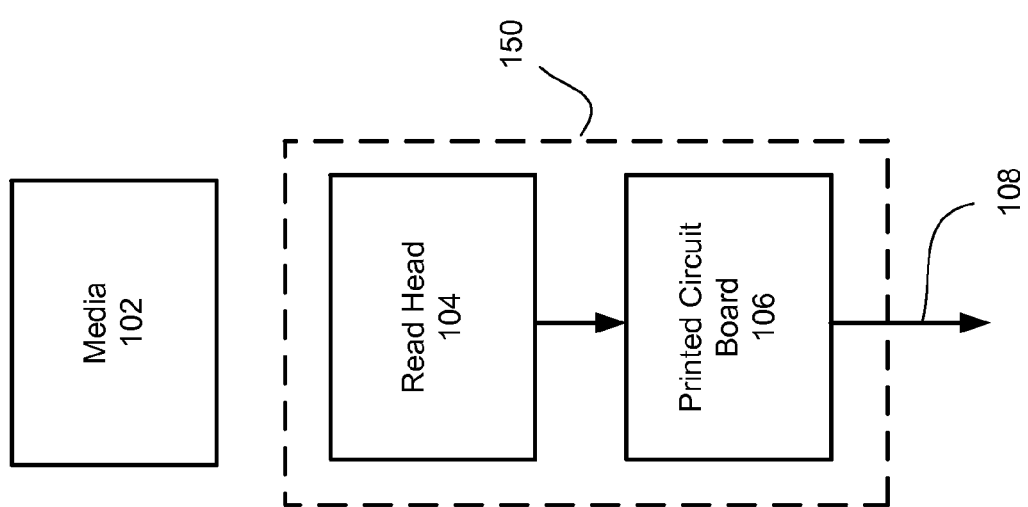
FIG. 1A is a block diagram of an example architecture for a system using a read head.

FIG. 1A is a block diagram of an example architecture for a system using a read head 104. For example, the read head 104 can be a magnetic read head that reads magnetic signals from magnetic media, a near field reader, or a chip card reader. The system can include media 102, the read head 104, and a printed circuit board 106. Circuitry on the printed circuit board 106, e.g., an application specific integrated circuit (ASIC) or a programmed microprocessor, can process the signals received from the read head 104 and perform operations based on the signals, and generate an output on an output terminal 108. For example, the circuitry on the printed circuit board 106 can determine, from the electrical signals, a digital output that describes, for example, alphanumeric values that represent data (e.g., a credit card number) stored in the stripe. The read head 104 and printed circuit board 106 are typically packaged together in a card reader 150.

In some implementations, once the digital output is determined, the card reader 150 encodes the digital output into an optical signal and transmits the optical signal to another device. Depending on the implementation, the card reader 150 can be configured to transmit the optical signal using visible light or infrared light. A device that is configured to receive the optical signal can receive and decode the optical signal to obtain the digital output.

In more detail, the circuitry on the printed circuit board 106 can be configured to encode the digital output into an optical signal using conventional modulation techniques including, for example, Manchester encoding or Quadrature phase-shift keying (QPSK) encoding. The circuitry can also be configured to provide the optical signal to a reader light source (e.g., a flash or a light emitting diode) on the card reader 150. The reader light source can then transmit the optical signal, for example, as pulses of light, to another device.

In some implementations, the card reader 150 is configured to receive and decode an optical signal, received from a device, to a digital signal. A device can transmit an optical signal to the card reader 150, for example, to provide the card reader 150 with an instruction or a notification. Depending on the implementation, the card reader 150 can be configured to receive the optical signal using visible light or infrared light.

In more detail, the card reader 150 can receive the optical signal using a reader light sensor on the card reader 150. Once received, the circuitry on the printed circuit board 106 can be configured to decode the optical signal to a digital output by demodulating conventional modulation techniques, for example, Manchester encoding or Quadrature phase-shift keying (QPSK) encoding, that were used to produce the optical signal.

In more detail, the card reader 150 can include a link layer that is configured to construct and transmit a preamble, generating synchronization patterns, encoding data into optical signals using forward error correction techniques (e.g., to generate ECC-encoded data), and transmit data according to the sync pattern.

FIG. 1B is a schematic perspective view of a card reader 150. The card reader 150 includes a body 154 that encapsulates a read head. The body 154 of the card reader 150 also includes a first slot 156; the first slot can be defined by a space between parallel first and second side wall 152 and closed off at the bottom by a bottom surface 162 extending between the side walls 152. The slot 156 can be open on near and far ends of the side walls 152. A card can be swiped through the slot 156 in the body 154. The read head can be positioned on the interior surface 158 of one of the side walls (see FIG. 2).

In some implementations, the body 154 of the card reader 150 also includes a second slot 160; the second slot 160 can be defined by a space between parallel first and second side wall 164 and closed off at the bottom by a bottom surface extending between the side walls 164. The slot 160 can be open on near and far ends of the side walls 164. In some implementations, the second slot 160 includes a reader light source and a reader light sensor for use in respectively transmitting and receiving optical signals, as described below in reference to FIG. 2.

Figure 2:
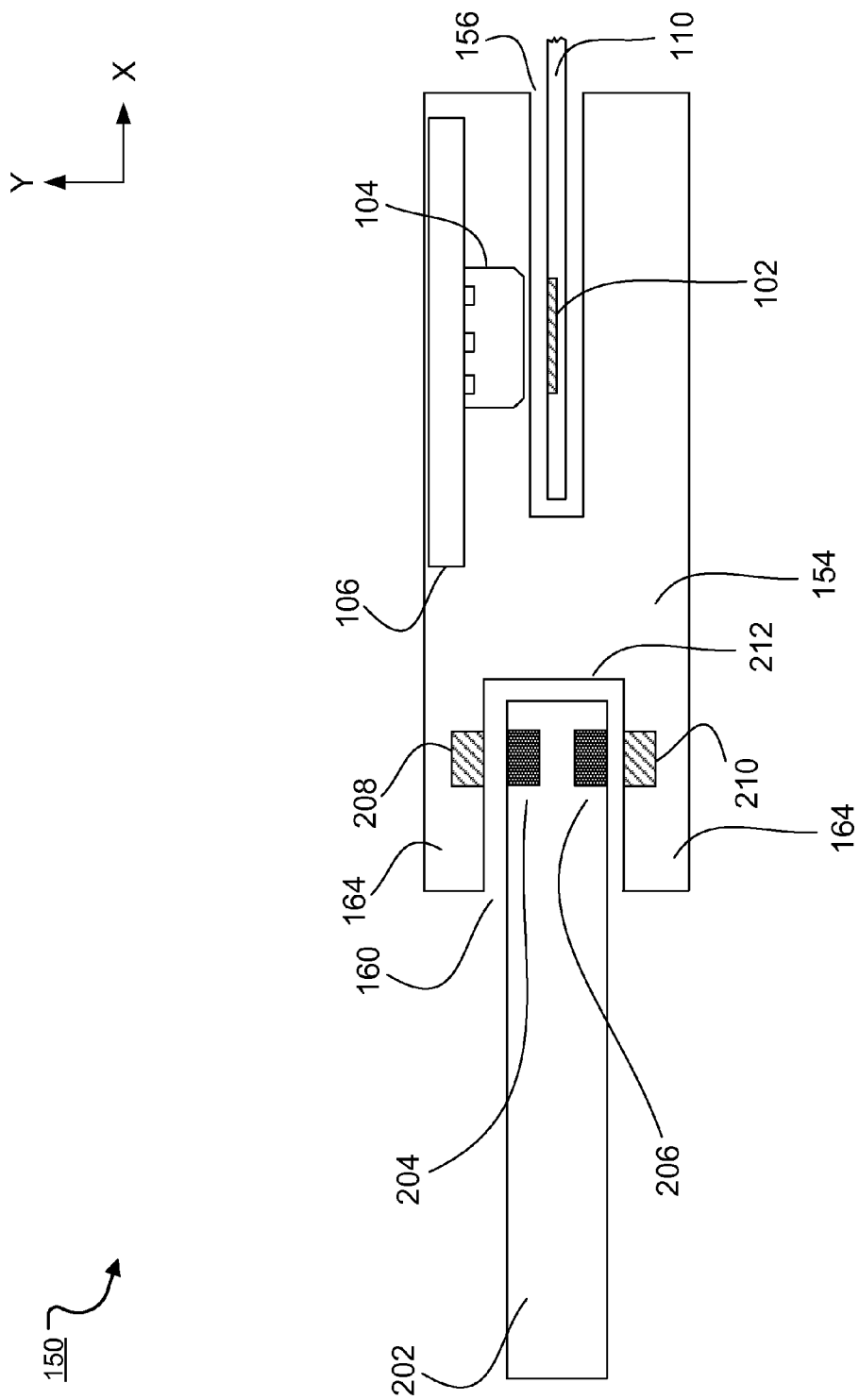
FIG. 2 is a side view of a read head in an example card reader with a card being swiped.

FIG. 2 is a side view of a read head 104 in the card reader 150 with a card 110 being swiped. The card reader 150 can include a body 154 that encapsulates a read head 104.

The card reader 150 also includes a second slot 160 of the body 154. The second slot 160 can be defined by a space between parallel first and second side wall 164 and closed off at the bottom by a bottom surface 212 extending between the side walls 164. The slot 160 can be open on near and far ends of the side walls 164.

The second slot 160 includes a reader light source 208 and a reader light sensor 210 for use in transmitting and receiving optical signals, respectively. The arrangement of the reader light source 208 and the reader light sensor 210 can vary depending on the device 202 with which the reader is configured to communicate. For example, the reader light source 208 and the reader light sensor 210 can be located on the side walls 164 on opposite sides of the slot 160. Alternatively, the reader light source 208 and the reader light sensor 210 can be located adjacent to each another on the same side wall 164.

A device 202 can be inserted into the second slot 160 in the body 154 so that a device light sensor 204 of the device 202 is adjacent to the reader light source 208 (e.g., a location from which the device light sensor 204 can sense light being emitted by the reader light source 208), and so that a device light source 206 of the device 202 is adjacent to the reader light sensor 210 (e.g., a location from which the reader light sensor 210 can sense light being emitted by the device light source 206). The device 202 can be coupled with the card reader 150 using, for example, a clip.

When inserted, the device light sensor 204 of the device 202 need not be in exact alignment with the reader light source 208. Similarly, the device light source 206 of the device 202 need not be in exact alignment with the reader light sensor 210. That is, the sensor on the card reader 150 is sufficiently far from the surface of the device 202 to accommodate some range of positions of the device light source 206 on the device 202 as well as some range of positions of the device light sensor 204 the device 202.

In some implementations, the card reader 150 includes a seal barrier, e.g., a rubber seal, along the edge of the second slot 160. When the card reader 150 is coupled with the device 202, the seal barrier can provide a firm grip and/or a light barrier from environmental light.

The device 202 can be a computing device, e.g., a hand-held computing device, capable of running a user application. For example, the device 202 can be a mobile device, e.g., a smartphone or tablet computer. The device 202 is capable of running software that is configured to allow the device 202 to generate and transmit optical signals using the device light source 206, for example, to the reader light sensor 210. The software is also configured to allow the device 202 to interpret optical signals that are received by the device light sensor 204, for example, from reader light source 208.

In some implementations, the software is configured to allow the device 202 to use its display screen as a device light source. For example, the device 202 can display pixels of a particular color to generate a parallel data stream. The reader light sensor 210 of the card reader 150 can be configured to receive and interpret the pixels being displayed.

In some implementations, the software is configured to calibrate the device light source 206 of the device 202 with the reader light sensor 210. During the calibration process, the capabilities of the device light source 206 are demonstrated to the reader light sensor 210 to train the card reader 150 to recognize the different intensities of light the device light source 206 is capable of producing. The different light intensities can be used to generate optical signals.

Once the device 202 is inserted, the card reader 150 can communicate with the device 202 using the reader light source 208 and the reader light sensor 210. In particular, the card reader 150 can transmit data to the device 202 by encoding a digital output (e.g., a digital output representing currents that were generated in response to a card swipe) to an optical signal, as described above, and by transmitting, using the reader light source 208, the optical signal to the device light sensor 204 of the device 202. Similarly, the device 202 can transmit data to the card reader 150 by encoding a digital output to an optical signal, as described above, and by transmitting, using the device light source 206, the optical signal to the reader light sensor 210 of the card reader 150.

Figure 3:
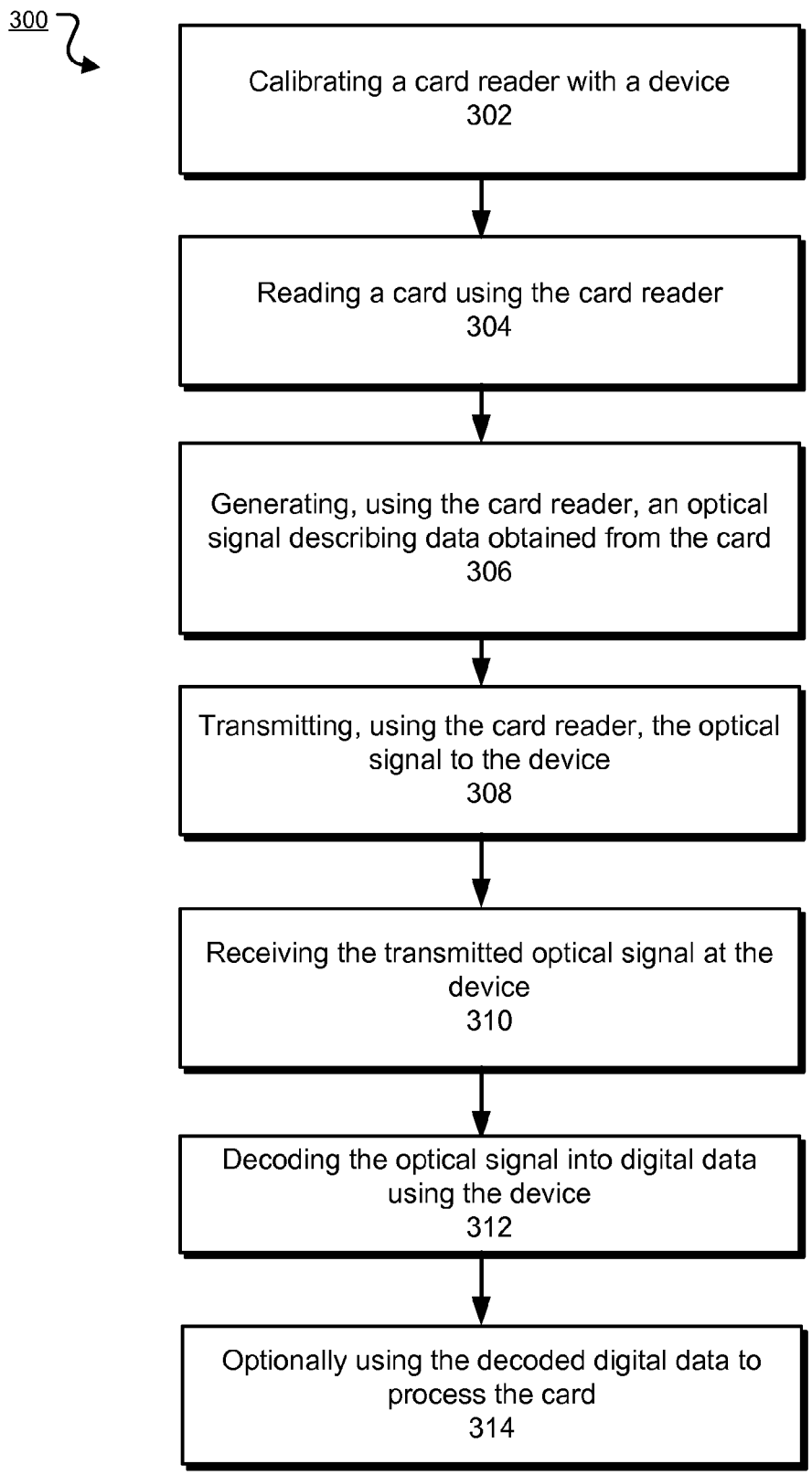
FIG. 3 is a diagram of an example flow chart of a process for communicating data between a card reader and a device using optical signals.

FIG. 3 is a diagram of an example flow chart of a process 300 for communicating data between a card reader and a device using optical signals. For convenience, the process 300 will be described as performed by a device, e.g., the device 202, and a card reader, e.g., the card reader 150, as described in reference to FIG. 2. The device and the card reader can be configured to transmit and receive optical signals to and from each other. In some implementations, this process is implemented through applications installed on the device and the card reader.

The device is calibrated with the card reader (302). In some implementations, before data is exchanged, the device is calibrated with the card reader. By calibrating with the card reader, the device is able to determine settings for transmitting and receiving optical signals.

In some implementations, the device calibrates a device light source with the card reader. Depending on the implementation, the device light source can be a camera flash or a light emitting diode (LED). Camera flashes and LEDs can vary in how they emit light depending on, for example, different modes of intensity with which they emit light. For example, one type of a camera flash can be limited to two modes: on or off. Other types of camera flashes can be dimmable with multiple modes (e.g., off, a low-intensity light mode, a medium-intensity light mode, and a high-intensity light mode). During calibration, the device is configured to teach to the card reader the different modes that the device light source is capable of performing. The device can use these different modes of the device light source to transmit optical signals. The calibration process trains the card reader to recognize the different modes so that they can be decoded accordingly.

When calibrating, the device can transmit an optical signal to the card reader to instruct the card reader to enter a calibration mode. The device can then demonstrate, to the card reader, the different modes using the device light source. The card reader can sense the different modes exhibited by the device light source using a reader light sensor. Depending on the implementation, the reader light sensor can be an ambient light sensor, which as the advantage of being able to sense changes in light at high speeds, or a camera. Once the different modes have been demonstrated, the card reader can store data describing the different modes for use in demodulating optical signals that are received from the device light source of the device.

Similarly, the card reader is also configured to calibrate a reader light source with the device. Thus, the card reader can demonstrate, to the device, different modes of intensity with which the reader light source can emit light. The device can store data describing the different modes for use in demodulating optical signals that are transmitted to and received from the card reader.

In some implementations the device calibrates a speed (e.g., baud rate) at which the device can transmit optical signals to the card reader. For example, the device can transmit a test optical signal to the card reader to instruct the card reader to enter a calibration mode. The device can then calibrate the baud rate by transmitting an optical signal to the card reader beginning at a slowest transmission speed and incrementing the transmission speed until transmission to the card reader fails. For example, when a transmission has failed, the card reader can be configured to transmit an optical signal to the device to notify the device of the failed transmission. Once a failed transmission is identified, the device can adjust the transmission speed to baud rate used to transmit the last successful transmission.

Similarly, the card reader calibrates a baud rate at which the card reader can transmit optical signals to the device. For example, the device can then calibrate the baud rate by transmitting an optical signal to the card reader beginning at a slowest transmission speed and incrementing the transmission speed until transmission to the device fails. For example, when a transmission has failed, the device can be configured to transmit an optical signal to the card reader to notify the card reader of the failed transmission. Once a failed transmission is identified, the card reader can adjust the transmission speed to baud rate used to transmit the last successful transmission.

The card reader reads data stored in a card (304). For example, the card reader can receive a swipe of a card and, upon swiping, can read data stored in the card, as described above.

The card reader generates an optical signal describing the data stored in the card (306). The card reader can convert the data read from the card into an optical signal, as described above in reference to FIG. 1A. In some implementations, the card reader and the device are configured to use one or more data ordering techniques when generating the optical signal to aid in the efficient transmission of optical signals. Data about card swipes may be ordered in specific ways to reduce latency for common outcomes. For example, on card swipe, the card reader may first transmit a summary of track decode outcomes (e.g., card failed swipe or card passed swipe) on each track, so a user interface can display the outcome (e.g., "failed swipe"), while other data is still being transmitted. Data ordering can be performed using well known data compression techniques. In some implementations, data ordering involves dividing the data into multiple transmitted packets, so the card reader does not need to wait for the entire data stream to be transmitted before decoding the optical signals.

The card reader transmits the optical signal to the device (308). The card reader can transmit the optical signal to the device by transmitting the optical signal through the reader light source, as described above. In some implementations, the card reader and the device are configured to use one or more data compression techniques to aid in the efficient transmission of optical signals. Data compression may be used to reduce the number of bits being transmitted, thus reducing transmission latency. Data compression can be performed using well known data compression techniques.

The device receives the optical signal from the card reader (310). The device light sensor of the device can receive the optical signal being transmitted from the card reader, as described above.

In some implementations, the device light sensor of the device is a camera. In such implementations, the camera captures a series of images of light pulses being emitted by the reader light sensor. The series of images are then evaluated to determine the optical signal. In such implementations, the speed at which the camera captures images can affect the rate at which data is transmitted from the card reader. To increase the transmission speed when using cameras that are slower at capturing images, the card reader can be configured to include multiple reader light sources (e.g., two, three, four, or more LEDs). Each of the multiple reader light sources can be configured so that an optical signal is transmitted in parallel to the device. The camera on the device can capture a series of images of light pulses being emitted by the multiple reader light sources. The series of images can then be evaluated to determine the optical signal.

In some implementations, the device light sensor of the device is an ambient light sensor. An ambient light sensor can detect transmissions of light, e.g., in a serial fashion at high speeds.

The device decodes the optical signal into digital data (312). The device can decode the received optical signal, for example, using the modulation techniques described above. In some implementations, the device and the card reader are configured to use error correction techniques for correcting errors in an optical signal. For example, the device or card reader may filter frequencies outside of the transmission range using well-known techniques. The raw demodulated bitstream may contain errors caused by random or systematic noise. These may be compensated for by standard forward error correction techniques, e.g., Hamming, BCH, Trellis codes, convolutional codes, Reed-Solomon, and LDPC.

The device uses the digital data to process the card (314). Once the optical signal has been decoded to digital data that describes data stored in the card, the device can use the digital data to process the swiped card. For example, the device can use the data to conduct a financial transaction (e.g., a credit card transaction) using the data stored in the card (e.g., a credit card number).

In some implementations, the device transmits an optical signal to the card reader to indicate whether the financial transaction using the card was successful. The device can transmit optical signals to the card reader using the process described above in reference to FIG. 3. For example, the device can generate an optical signal describing data indicating whether the financial transaction was successful. The device can transmit the optical signal to the card reader. The card reader can receive the transmitted optical signal and can decode the optical signal into digital data. Once decoding is complete, the card reader can perform additional operations based on whether the financial transaction was successful.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A card reader, comprising:
    a body of the card reader, the body defining a device opening to receive at least a portion of a computing device that includes a device sensor and a device emitter, the body also defining a card opening to receive at least a portion of a transaction card;
    a reader interface positioned at least partially along an interior of the card opening of the card reader, the reader interface to read card data from the transaction card and generate a reader interface signal based on the card data;
    encoding circuitry within the body of the card reader to encode the reader interface signal generated by the reader interface into an encoded signal and send the encoded signal to a reader emitter for transmission to the device sensor;
    a reader emitter positioned at least partially along an interior of the device opening of the card reader, the reader emitter to transmit the encoded signal to the device sensor of the computing device, wherein the reader emitter is positioned adjacent to the device sensor when the computing device is received by the device opening of the card reader; and
    a reader sensor positioned at least partially along the interior of the device opening of the card reader to receive device data from the device emitter of the computing device, wherein the reader sensor is positioned adjacent to the device emitter when the computing device is received by the device opening of the card reader.

2. The card reader of claim 1, wherein the reader emitter includes a light source, and wherein the device sensor includes at least one of a light sensor or a camera.

3. The card reader of claim 1, wherein the reader sensor includes at least one of a light sensor or a camera, and wherein the device emitter is a light source.

4. The card reader of claim 1, wherein the reader interface is configured to read data from a chip of the transaction card as at least the portion of the transaction card is received by the card opening of the card reader.

5. The card reader of claim 1, wherein the encoded signal is an optical signal.

6. The card reader of claim 1, wherein the reader interface is configured to read data from a magnetic stripe of the transaction card as at least the portion the transaction card is swiped through the card opening of the card reader.

7. The card reader of claim 1, further comprising a barrier along at least a portion of at least one of the reader emitter or the reader sensor, the barrier preventing environmental noise from entering the reader sensor.

8. The card reader of claim 1, wherein a camera flash is included in at least one of the reader emitter or the device emitter.

9. The card reader of claim 1, wherein the reader interface includes a near-field reader configured to read data from a near-field transaction card.

10. A method for transmitting data from a card reader to a computing device, the method comprising:
    obtaining, using a reader interface positioned at least partially along an interior of a card slot of the card reader, card data from a transaction card;
    generating, using the reader interface of the card reader, a digital reader interface data signal that describes the card data;

generating, using encoding circuitry within the card reader, an encoded signal by encoding the digital reader interface data signal;

transmitting the encoded signal from a reader emitter of the card reader to a device sensor of a computing device, wherein at least a portion of the computing device is received within a device opening of the card reader so that the device sensor of the computing device is adjacent to the reader emitter of the card reader and so that a device emitter of the computing device is adjacent to a reader sensor of the card reader, wherein the reader emitter of the card reader is positioned at least partially along an interior of the device opening of the card reader; and receiving device data from the device emitter of the computing device at the reader sensor of the card reader, wherein the reader sensor of the card reader is positioned at least partially along the interior of the device opening of the card reader.

11. The method of claim 10, further comprising sending a calibration signal from the reader emitter to the device sensor of the computing device to determine a signal intensity for transmitting the encoded signal.

12. The method of claim 11, further comprising calibrating the reader by determining a rate at which the reader emitter is able to emit the encoded signal and at which the device sensor is able to detect the encoded signal.

13. The method of claim 10, wherein the reader emitter comprises a first emitter and a second emitter, and wherein transmitting the encoded signal from the reader emitter of the card reader to the device sensor of the computing device comprises transmitting the encoded signal to the device sensor using the emitter and the second emitter, wherein each of the first emitter and the second emitter transmits a portion of the encoded signal.

14. The method of claim 10, wherein the device data is received via one or more emissions of light, and wherein receiving device data from the device emitter of the computing device at the reader sensor of the card reader comprises:

capturing, using the reader sensor, one or more images of the one or more emissions of light, and evaluating the one or more images to determine the device data.

15. The method of claim 10, wherein obtaining, using the reader interface of the card reader, the card data from the transaction card comprises reading data from a medium of the transaction card, wherein the medium includes at least one of a magnetic stripe, a chip, or a near-field module.

16. A method for transmitting data from a computing device to a card reader, the method comprising:

receiving an encoded signal at a device sensor of a computing device, the encoded signal having been transmitted by a reader emitter positioned at least partially along an interior of a device opening of a card reader, the device opening of the card reader receiving at least a portion of the computing device, the encoded signal generated by encoding circuitry within the card reader, the encoded signal generated based on card data read by a reader interface from a card received by a card slot of the card reader;

generating a device signal via the computing device; and transmitting the device signal from a device emitter of the computing device to a reader sensor of the card reader, the reader sensor positioned at least partially along the interior of the device opening of the card reader.

17. The method of claim 16, further comprising:

calibrating the card reader with the computing device to determine at least one signal intensity for receiving the encoded signal.

18. The method of claim 16, further comprising calibrating the card reader by determining a rate at which the reader emitter is able to emit the encoded signal and at which the device sensor is able to detect the encoded signal.

19. The method of claim 16, wherein the encoded signal comprises one or more emissions of light, and wherein receiving the encoded signal at the device sensor of a computing device comprises:

capturing, using the device sensor, one or more images of the one or more emissions of light, and evaluating the images to determine the encoded signal.

20. The method of claim 16, further comprising applying, by the computing device, one or more error correction techniques to the encoded signal for correcting one or more errors in the encoded signal.

* * * * *